(12) United States Patent
Sumita

(10) Patent No.: US 6,616,747 B2
(45) Date of Patent: Sep. 9, 2003

(54) PROCESS FOR PRODUCING GRANULAR HEMATITE PARTICLES

(75) Inventor: Hiroshi Sumita, Okayama-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/112,058

(22) Filed: Apr. 1, 2002

(65) Prior Publication Data

US 2003/0051636 A1 Mar. 20, 2003

(30) Foreign Application Priority Data

Sep. 13, 2001 (JP) .......................................... 2001-277617

(51) Int. Cl.$^7$ ................................................. C09C 1/22
(52) U.S. Cl. ........................................ 106/456; 423/633
(58) Field of Search ............................ 106/456; 423/633

(56) References Cited

U.S. PATENT DOCUMENTS

| 2,633,407 | A | | 3/1953 | Marsh | |
|---|---|---|---|---|---|
| 2,716,595 | A | * | 8/1955 | Harrison | ..................... 423/633 |
| 3,946,103 | A | * | 3/1976 | Hund | ......................... 423/633 |
| 6,179,908 | B1 | | 1/2001 | Braun et al. | |
| 6,231,661 | B1 | | 5/2001 | Hayashi et al. | |
| 6,503,315 | B1 | * | 1/2003 | Etzenbach et al. | .......... 106/456 |

FOREIGN PATENT DOCUMENTS

| EP | 0 911 369 A1 | 4/1999 |
|---|---|---|
| EP | 0 997 500 A1 | 5/2000 |
| EP | 1 106 577 A2 | 6/2001 |

* cited by examiner

*Primary Examiner*—C. Melissa Koslow
*Assistant Examiner*—Shalie A. Manlove
(74) *Attorney, Agent, or Firm*—Nixon & Vanderhye P.C.

(57) ABSTRACT

The process for producing granular hematite particles of the present invention, comprises passing an oxygen-containing gas through an aqueous ferrous nitrate solution in the presence of iron materials and hematite seed crystals at a temperature of 80 to 90° C., thereby obtaining reddish brown precipitates containing granular hematite particles as a main component; subjecting the reddish brown precipitates to filtration, water-washing and then drying; and heat-treating the reddish brown precipitates in air at a temperature of 450 to 900° C. In accordance with the process of the present invention, the granular hematite particles exhibiting a high purity, a small equilibrium water content and a reduced oil absorption can be produced using inexpensive iron raw materials without use of a specific device such as autoclave in an industrially and economically useful manner.

8 Claims, No Drawings

PROCESS FOR PRODUCING GRANULAR HEMATITE PARTICLES

BACKGROUND OF THE INVENTION

The present invention relates to a process for producing granular hematite particles, and more particularly, to a process for producing granular hematite particles having a high purity, a small equilibrium water content and a reduced oil absorption in an industrially and economically useful manner.

The granular hematite particles produced according to the process of the present invention are useful as red-based color iron oxide pigments for paints, colored resins, printing inks, cosmetics, building materials or the like.

Granular hematite particles exhibit a red color varying from light red to deep red and, therefore, have been extensively used as red-based color iron oxide pigments for producing paints, colored resins, printing inks and cosmetics by mixing the pigments with vehicle or resin, or for producing building materials by mixing the pigments with cement, concrete, asphalt, etc.

Since the hue and particle size of the granular hematite particles have a close relationship with each other, various granular hematite particles having different colors varying from light red to deep red have been produced by appropriately controlling the particle size thereof. The granular hematite particles having a larger particle size tend to exhibit a deeper hue. For example, the granular hematite particles having an average particle diameter of not more than 0.2 μm, e.g., 0.05 to 0.2 μm, exhibit a light red color, while those having an average particle diameter of 0.4 to 0.6 μm exhibit a deep red color. In addition, the granular hematite particles having an average particle diameter of from more than 0.2 to less than 0.4 μm exhibit a half-tone color between light red and deep red.

In recent years, from industrial and economical viewpoints, it has been strongly required to produce granular hematite particles, i.e., red-based color iron oxide pigments having a high quality and excellent properties using inexpensive materials without use of any specific device such as autoclave.

Hitherto, the red-based color iron oxide pigments have been typically produced (i) by passing an oxygen-containing gas through a suspension containing ferrous hydroxide obtained by reacting an aqueous ferrous sulfate solution with an aqueous alkali hydroxide solution such as aqueous sodium hydroxide solution while keeping the suspension at a pH value of 4.5 to 6.5 and a temperature of 65 to 90° C. to form magnetite particles; subjecting the thus obtained magnetite particles to filtration, water-washing and drying; and then heat-treating the magnetite particles at a temperature of 450 to 800° C. (for example, Japanese Patent Publication (KOKOKU) No. 49-35520(1974), etc.), (ii) by producing hematite particles in an aqueous solution; and subjecting the thus obtained hematite particles to filtration, water-washing and then drying (for example, Japanese Patent Publication (KOKOKU) Nos. 35-1224(1960) and 38-9852(1963), Japanese Patent Application Laid-Open (KOKAI) Nos. 49-73400(1974), 51-8193(1976) and 2001-200177, etc.); or the like.

At present, it has been strongly required to produce granular hematite particles having a high purity, a smaller equilibrium water content and a more reduced oil absorption in an industrially and economically useful manner. However, any of the above conventional methods fails to produce granular hematite particles fulfilling these properties in an industrial and economical methord.

Namely, the method described in Japanese Patent Publication (KOKOKU) No. 49-35520(1974) is disadvantageous from industrial and economical viewpoints since the aqueous solution containing expensive alkali hydroxide such as sodium hydroxide is used as the raw material.

In Japanese Patent Publication (KOKOKU) No. 35-1224 (1960), there is described the method of producing hematite particles by preparing an aqueous iron nitrate solution by using non-pyrite particles and an aqueous nitric acid solution; heating the resultant aqueous iron nitrate solution from which residues are removed, at a temperature of not less than 50° C., especially, 135 to 250° C. in a closed pressure reaction vessel; and then rapidly cooling the solution. Thus, this method requires the use of the pressure reaction vessel, i.e., autoclave.

In Japanese Patent Publication (KOKOKU) No. 38-9852 (1963), there is described the method of producing hematite particles in an aqueous solution by continuously introducing a gaseous oxidant into an acidic ferrous salt solution having a pH value of 4 to 5 in the presence of iron materials in an autoclave. Thus, this method also requires the use of the pressure reaction vessel, i.e., autoclave. Further, in this KOKOKU, it is described that "the red ferric oxide produced by the present method was α-type iron oxide, and as a result of the analysis, it was confirmed that products obtained at a reaction temperature of 95° C. were $Fe_2O_3 \cdot \frac{1}{2}H_2O$ while those obtained at a reaction temperature of 120° C. were $Fe_2O_3$". Thus, in this method, the hematite particles produced under ordinary pressure exhibit a low purity.

In Japanese Patent Application Laid-Open (KOKAI) No. 49-73400(1974), there is described the method of producing hematite particles by passing an oxygen-containing gas through an aqueous ferrous salt solution in the presence of seed crystals and metal iron. In this method, although no specific device such as autoclave is used, the obtained hematite particles contain as impurities α-FeOOH in an amount of about 15% or less.

In Japanese Patent Application Laid-Open (KOKAI) No. 51-8193(1976), there is described the method of producing hematite particles by adding to an aqueous ferrous salt solution, as an alkali component, alkali hydrogen carbonate solely in an equivalent amount or more based on acid radical, or as an alkali component, alkali hydrogen carbonate and alkali carbonate in combination with alkali hydroxide such that the total alkali content is not less than an equivalent amount based on the acid radical and the alkali hydroxide content is not more than an equivalent amount based on the acid radical; and subjecting the resultant solution to oxidation reaction at a pH value of 7 to 11 and a temperature of from 65° C. to the boiling point. Although no specific device such as autoclave is used, since expensive alkali carbonate is used as the aqueous alkali solution, this method is not advantageous from industrial and economical viewpoints. Furthermore, in this KOKAI, it is described that "as a result of X-ray analysis, it was confirmed that most of the products were hematite". Thus, the description means that the hematite particles produced by this method still contain impurities.

In Japanese Patent Application Laid-Open (KOKAI) No. 2001-200177, there is described the method of producing iron oxide red pigments having an excellent chroma by passing an oxygen-containing gas through an aqueous iron chloride solution at a temperature of 70 to 100° C. in the presence of iron materials and hematite seed crystals to obtain reddish brown precipitates containing granular hematite particles as a main component, wherein hematite produced by reacting dilute nitric acid with the iron materials at a temperature of not less than 90° C. is used as the hematite seed crystals. In this KOKAI, there are described no teachings and suggestions concerning improvements in purity, equilibrium water content and the like.

As a result of the present inventors' earnest studies, it has been found that by passing an oxygen-containing gas through an aqueous ferrous nitrate solution at a temperature of 80 to 90° C. in the presence of iron materials and hematite seed crystals to form reddish brown precipitates containing granular hematite particles as a main component; subjecting the obtained reddish brown precipitates to filtration, water-washing and drying; and then heat-treating the reddish brown precipitates in air at a temperature of 450 to 900° C., the obtained granular hematite particles can exhibit a high purity, a small equilibrium water content and a reduced oil absorption. The present invention has been attained on the basis of the finding.

SUMMARY OF THE INVENTION

An object of the present invention is to provide a process for producing granular hematite particles exhibiting a high purity, a small equilibrium water content and a reduced oil absorption using inexpensive raw materials without use of a specific device (pressure reaction vessel) such as autoclave, in an industrially and economically useful manner.

To accomplish the aim, in a first aspect of the present invention, there is provided a process for producing granular hematite particles, which comprises passing an oxygen-containing gas through an aqueous ferrous nitrate solution in the presence of iron materials and hematite seed crystals at a temperature of 80 to 90° C. to obtain reddish brown precipitates containing granular hematite particles as a main component; subjecting the reddish brown precipitates to filtration, water-washing and then drying; and heat-treating the reddish brown precipitates in air at a temperature of 450 to 900° C.

In a second aspect of the present invention, there is provided a process for producing granular hematite particles, which comprises passing an oxygen-containing gas through an aqueous ferrous nitrate solution in the presence of iron materials and hematite seed crystals at a temperature of 80 to 90° C. to obtain reddish brown precipitates containing granular hematite particles as a main component, said hematite seed crystals being hematite particles obtained by adding dilute nitric acid to an aqueous solution containing the iron materials while maintaining the aqueous solution at a temperature of 90 to 95° C. to produce ferric nitrate precipitates, and then hydrolyzing the ferric nitrate precipitates; subjecting the reddish brown precipitates to filtration, water-washing and then drying; and then heat-treating the reddish brown precipitates in air at a temperature of 450 to 900° C.

In a third aspect of the present invention, there is provided red-based color iron oxide pigments produced by passing an oxygen-containing gas through an aqueous ferrous nitrate solution in the presence of iron materials and hematite seed crystals at a temperature of 80 to 90° C. to obtain reddish brown precipitates containing granular hematite particles as a main component; subjecting the reddish brown precipitates to filtration, water-washing and then drying; and then heat-treating the reddish brown precipitates in air at a temperature of 450 to 900° C., which have an average particle diameter of 0.05 to 0.6 $\mu$m, a hematite content of not less than 97% by weight, an equilibrium water content of not more than 0.5%, a heat resistance of not less than 450° C., a tinting strength of not less than 105%, and a hue represented by an L* value of 22 to 33, an a* value of 24 to 37 and a b* value of 13 to 40.

DETAILED DESCRIPTION OF THE INVENTION

The present invention will now be described in detail below.

First, the process for producing granular hematite particles according to the present invention is described.

The aqueous iron salt solution used in the present invention, is an aqueous ferrous nitrate solution. Even though aqueous iron salt solutions other than the aqueous ferrous nitrate solution, such as aqueous iron chloride solution, are used, it may be difficult to obtain granular hematite particles aimed in the present invention. In the consideration of industrial and economical advantages, the aqueous ferrous nitrate solution preferably has a concentration of 1.0 to 2.5 mol/liter and a pH value of 2 to 4.

As the iron materials used in the present invention, there may be exemplified various scrap irons such as chopped scrap iron or the like. The iron materials are present in an excess amount exceeding the amount of iron consumed until completing the production reaction of the granular hematite particles. When the amount of the iron materials present is insufficient, it may be difficult to sufficiently conduct growth reaction of the hematite seed crystals. For this reason, the granular hematite particles produced by heat-treating the reddish brown precipitates recovered from the aqueous solution have a small average particle size, so that it may also be difficult to obtain red-based color iron oxide pigments having an aimed hue.

The hematite seed crystals used in the present invention are preferably granular particles having an average particle diameter of usually from 0.005 to less than 0.1 $\mu$m, preferably 0.005 to 0.05 $\mu$m, more preferably 0.01 to 0.05 $\mu$m. When the average particle diameter of the hematite seed crystals is out of the above-specified range, it may be difficult to uniformly and sufficiently conduct the growth reaction of the hematite seed crystals during the subsequent production reaction of the granular hematite particles, so that the granular hematite particles produced from the aqueous solution tend to have a non-uniform particle size distribution.

The hematite seed crystals having an average particle diameter within the above-specified range can be produced by adding dilute nitric acid to an aqueous solution containing the iron materials while maintaining the aqueous solution at a temperature of usually 90 to 95° C., preferably 90 to 94° C. to form ferric nitrate precipitates; and then hydrolyzing the thus obtained ferric nitrate precipitates.

When the temperature of the aqueous solution upon adding the dilute nitric acid thereto during the production reaction of the hematite seed crystals is less than 90° C., a large amount of $\alpha$-FeOOH and the like tend to be produced in addition to the aimed hematite seed crystal particles. When the temperature of the aqueous solution is more than 95° C., the production reaction of the hematite seed crystals proceeds too rapidly, so that it may be difficult to adequately control the particle size of the obtained hematite seed crystal particles or the like.

The concentration of the dilute nitric acid added is preferably 20 to 30%.

The dilute nitric acid may be added at one time, in separate parts or continuously. Among these addition methods, continuous addition of the dilute nitric acid is preferred.

It is required to conduct the hydrolysis reaction of the ferric nitrate during the production reaction of the hematite seed crystals while keeping the reaction system uniform, for example, by circulating the reaction solution therethrough.

The hydrolysis temperature is in the range of usually 90 to 95° C. similarly to that used upon addition of the dilute nitric acid. The hydrolysis time is preferably 1 to 4 hours.

The hematite seed crystals used upon the production of the granular hematite particles of the present invention, may be used in any suitable form such as slurry, cake or particles. Among these forms, slurry is preferred, and such a slurry having a concentration of 20 to 40 g/liter is more preferred.

The amount of the hematite seed crystals present upon the production of the granular hematite particles is preferably 5 to 40% by weight, more preferably 10 to 30% by weight based on the weight of the granular hematite particles produced from the aqueous solution. When the amount of the hematite seed crystals is less than 5% by weight, it may be difficult to conduct a uniform growth reaction of the hematite seed crystals because of a too small amount of the hematite seed crystals. When the amount of the hematite seed crystals is more than 40% by weight, it may take a very long time to produce granular hematite particles having the aimed particle sizes because of a too large amount of the hematite seed crystals, resulting in industrially and economically disadvantageous process.

In the process of the present invention, the temperature of the aqueous solution upon passing the oxygen-containing gas therethrough is usually 80 to 90° C., preferably 82 to 90° C. When the temperature of the aqueous solution is less than 80° C., a large amount of goethite particles may tend to be contained in the obtained granular hematite particles. When the temperature of the aqueous solution is more than 90° C., although reddish brown precipitates containing granular hematite particles as a main component can be obtained, it is unnecessary to use such a high temperature since effects obtained by the temperature rise is already saturated. As far as the temperature of the aqueous solution lies in the range of 80 to 90° C., the temperature of the aqueous solution and the amount of air passed may be kept constant from initial stage to terminal stage of the reaction, or may vary with the passage of time according to progress of the reaction such as viscosity of the reaction matrix solution (mother), size (hue) of the obtained granular hematite particles or the like.

Upon the production reaction of the granular hematite particles, when the aqueous ferrous nitrate solution containing the iron materials and the hematite seed crystals is not gelled because of a too low viscosity thereof, an additional amount of the aqueous ferrous nitrate solution may be added to the reaction system, if required, in order to conduct the reaction at a higher concentration.

The oxygen-containing gas used in the present invention may include, for example, air.

The growth reaction of the hematite seed crystal particles may be monitored by periodically sampling a part of the obtained reddish brown precipitates and comparing the hue of the sampled reddish brown particles with that of standard pigments. The terminal point of the growth reaction of the hematite seed crystals is determined to be the time at which the hue of the sampled particles is identical to an aimed hue of the standard pigments.

After completion of the growth reaction of the hematite seed crystal particles, the reaction product may be passed through a filter of 200 to 330 meshes in order to separate and remove the iron materials from the reddish brown precipitates.

The thus obtained reddish brown precipitates may be filtered out, washed with water and then dried by ordinary methods, and further may be pulverized, if required, by ordinary method using an atomizer or the like.

The obtained reddish brown precipitates are mixed particles containing usually not more than 96% by weight of granular hematite particles and the balance composed of α-FeOOH and/or α-$Fe_2O_3$.x$H_2O$. The mixed particles have an equilibrium water content as large as about 0.8% to about 1.2%, a tinting strength as low as not more than 100%, and a heat resistance as low as not more than 220° C. In particular, deep-red granular hematite particles having an average particle diameter of 0.4 to 0.6 μm are obtained from the aqueous solution in the form of apparently large-size agglomerated particles constituted by several primary particles. When such agglomerated particles are pulverized into small particles, the thus pulverized particles exhibit a large change in hue from that of the agglomerated particles. Even though the agglomerated granular hematite particles exhibit a deep red color before the pulverization, the hue of the pulverized particles is changed to a light red color. As a result, it may be difficult to obtain pigments showing a deep red color. More specifically, when deep-red agglomerated granular hematite particles having an L* value of 22 to 24, an a* value of 24 to 29 and a b* value of 13 to 20 are pulverized, the L*, a* and b* values of the pulverized particles tend to be changed to 25 to 29, 30 to 34 and 30 to 35, respectively. Namely, the pulverized particles tend to exhibit a light red color.

In the process of the present invention, the reddish brown precipitates obtained from the aqueous solution are heat-treated in air at a temperature of usually 450 to 900° C., preferably 600 to 900° C. When the heating temperature is less than 450° C., it may be difficult to obtain granular hematite particles having a high purity, a small equilibrium water content and a reduced oil absorption. When the heating temperature is more than 900° C., the obtained particles become hard because of sintering caused within or between the particles, so that it may be difficult to readily pulverize such particles and, therefore, uniformly disperse such pulverized particles in vehicle or resin.

The time required for heat-treating the reddish brown precipitates in air is preferably 30 to 150 minutes, more preferably 50 to 100 minutes. When the heat-treating time is less than 30 minutes, the dehydration treatment may become insufficient, so that it may be difficult to obtain hematite particles having a small equilibrium water content. The heat-treating time of more than 90 minutes is unnecessary since effects obtained by prolonging the time are already saturated.

The granular hematite particles produced according to the process of the present invention have an average particle diameter of usually 0.05 to 0.6 μm; a high purity, i.e., a hematite content of usually not less than 97% by weight, preferably not less than 97.5% by weight, more preferably not less than 98% by weight; and an equilibrium water content of usually not more than 0.5%, preferably not more than 0.3%, more preferably not more than 0.25%. Also, the oil absorption of the granular hematite particles produced according to the process of present invention is improved so as to be lower by usually about 3% to about 35%, preferably 5 to 33% than that of the granular hematite particles obtained in the aqueous solution. Further, the granular hematite particles produced according to the process of the present invention are improved in heat resistance and tinting strength, and specifically have a heat resistance of usually not less than 450° C., preferably 500 to 800° C.; and a tinting strength of usually 105 to 120%. In particular, the granular hematite particles having an average particle diameter of 0.4 to 0.6 μm are free from change in hue even when pulverized into small particles, and can exhibit an aimed hue, i.e., an L* value of usually 22 to 24, an a* value of usually 24 to 29 and a b* value of usually 13 to 20. Further, red-based color iron oxide pigments can be produced from the granular hematite particles having the above properties.

The point of the present invention is that by passing an oxygen-containing gas through an aqueous ferrous nitrate solution at a temperature of usually 80 to 90° C. in the presence of iron materials and hematite seed crystals to form reddish brown precipitates containing granular hematite particles as a main component; subjecting the obtained reddish brown precipitates to filtration, water-washing and drying; and then heat-treating the reddish brown precipitates in air at a temperature of 450 to 900° C., it is possible to produce granular hematite particles exhibiting a high purity, a small equilibrium water content and a reduced oil absorption without using a specific device such as autoclave, in an industrially and economically useful manner.

The reason why the high-purity hematite particles can be obtained by the process of the present invention, is considered by the present inventors as follows. That is, it is considered that since the reddish brown particles obtained from the aqueous solution are heat-treated, $H_2O$ as crystalline impurities of $\alpha$-FeOOH and/or $\alpha$-$Fe_2O_3 \cdot xH_2O$ contained in the reddish brown particles can be removed, so that the $\alpha$-FeOOH and/or $\alpha$-$Fe_2O_3 \cdot xH_2O$ are transformed into hematite.

The reason why the granular hematite particles can exhibit a small equilibrium water content, is considered by the present inventors as follows. That is, it is considered that since the reddish brown particles obtained from the aqueous solution are heat-treated, the obtained hematite particles have a smooth surface, thereby preventing water from being readily adsorbed therein.

The reason why the granular hematite particles can exhibit a reduced oil absorption, is considered by the present inventors as follows. That is, it is considered that since the reddish brown particles obtained from the aqueous solution are heat-treated, the obtained hematite particles have a small surface area and a smooth surface.

The reason why the granular hematite particles can exhibit an excellent heat resistance, is considered by the present inventors as follows. That is, it is considered that since $H_2O$ as crystalline impurities of $\alpha$-FeOOH and/or $\alpha$-$Fe_2O_3 \cdot xH_2O$ contained in the reddish brown particles can be removed as described above, the $\alpha$-FeOOH and/or $\alpha$-$Fe_2O_3 \cdot xH_2O$ are transformed into hematite having a high heat resistance.

The reason why the obtained hematite particles can exhibit an excellent tinting strength, is considered by the present inventors as follows. That is, it is considered that the polycrystalline agglomerated particles obtained from the aqueous solution can be transformed into single crystal particles by heating the agglomerated particles.

The reason why the obtained granular hematite particles can exhibit an optional hue varying from light red color to deep red color, is considered by the present inventors to be that the particle size thereof can be adequately controlled.

In accordance with the process of the present invention, it is possible to produce granular hematite particles having a high purity, a small equilibrium water content and a reduced oil absorption as well as excellent tinting strength and heat resistance. Therefore, the thus obtained granular hematite particles are suitably used as red-based color iron oxide pigments for paints, colored resins, printing inks, cosmetics and building materials.

Further, since the granular hematite particles having the above properties can be produced using inexpensive iron raw materials without use of a specific device such as autoclave, the process of the present invention is advantageous from industrial and economical viewpoints.

EXAMPLES

The present invention will now be described in more detail with reference to the following examples, but these examples are not intended to limit the present invention thereto.

Various properties were measured and evaluated by the following methods.

(1) The average particle size of the particles was expressed by the value measured by BET method.

(2) The purity of the pigments was expressed by the value measured by the method prescribed in JIS K 5109-1972 "Red Iron Oxide (Pigments), 7.3: Ferric Oxide" as follows. That is, a sample was dissolved in hydrochloric acid. The resultant solution was mixed with a stannous chloride solution to reduce iron contained therein. Further, a mercuric chloride solution was added to the above solution to precipitate mercurous chloride. The obtained reaction solution was mixed with a sodium diphenylamine-4-sulfonate solution as an indicator, and then titrated using a potassium bichromate solution. The purity of the pigments was expressed by the value obtained from the above titration.

(3) The equilibrium water content was expressed by the value measured by the method prescribed in JIS K 5101-1978 "Pigment Testing Method, 22: Water Solubles".

(4) The oil absorption was expressed by the value measured by the method prescribed in JIS K 5101-1978 "Pigment Testing Method, 19: Oil Absorption".

(5) The heat resistance was determined as follows. That is, the below-mentioned test piece (coated plate) was placed in an electric furnace, and then while varying the temperature of the electric furnace, heat-treated for 15 minutes at each temperature. The hues (L*, a* and b* values) of the coated plate before and after the heat-treatment at each temperature were respectively measured using a Multi-spectro-colourmeter MSC-IS-2D (manufactured by SUGA SHIKENKI CO., LTD.). Based on the measured values before the heat-treatment as standard values, the ΔE* value was calculated according to the following formula:

$$\Delta E^* \text{value} = ((\Delta L^*)^2 + (\Delta a^*)^2 + (\Delta b^*)^2)^{1/2}$$

wherein ΔL* represents the difference between the L* values before and after the heat-treatment; Δa* represents the difference between the a* values before and after the heat-treatment; and Δb* represents the difference between the a* values before and after the heat-treatment.

On the semi-logarithmic graph paper, the heating temperatures were plotted on the abscissa-axis, and the ΔE* values were plotted on the ordinate-axis. The temperature at which the ΔE* value was identical to just 2.0, was determined to be the heat-resisting temperature of coating film.

Meanwhile, the test piece was produced by applying a coating material prepared by the below-mentioned method onto a cold-rolled steel plate (0.8 mm×70 mm×150 mm; JIS G-3141) so as to form a coating layer having a thickness of 150 μm thereon and then drying the coating layer. The hues, i.e., L*, a* and b* values of the thus obtained test piece were measured in the Lab space of Hunter using a Multi-spectro-colour-meter MSC-IS-2D (manufactured by SUGA SHIKENKI CO., LTD.), and expressed by the values according to the (L*, a* and b*) uniform sensory color space of Commission Internnationale de l'Eclairage CIE 1976.

(6) The tinting strength was determined by the following method. That is, respective vehicle enamels prepared using red-based pigments before and after the heat-treatment by the below-mentioned method were applied on a cast-coated paper by a 150 μm (6-mil) applicator to produce coated pieces. The thus obtained coated pieces were measured using a Multi-spectro-colour-meter "MSC-IS-2D" (manufactured by SUGA SHIKENKI CO., LTD.) to determine L* values thereof. The tinting strength (%) was expressed by the value calculated according to the following formula:

Tinting strength (%)=100+[($Ls^*-Lm^*$)×10]

wherein Ls* represents the L* value of vehicle enamel using the red-based pigments before the heat-treatment as a standard sample; and Lm* represents the L* value of vehicle enamel using the red-based pigments after the heat-treatment.

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with additional 50 g of an amino alkyd resin, and further dispersed for 5 minutes by a paint shaker, thereby preparing a primary color enamel.

Preparation of Vehicle Enamel:

12 g of the above-prepared primary color enamel and 40 g of Amilac White (titanium dioxide-dispersed amino alkyd resin) were blended together, and the resultant mixture was mixed and dispersed for 15 minutes by a paint shaker, thereby preparing a vehicle enamel.

(7) The hue of the particles was measured by the following method. That is, 0.5 g of the sample particles and 0.5 ml of castor oil were kneaded together by a Hoover's muller to form a paste. 4.5 g of clear lacquer was added to the obtained paste, and the mixture was kneaded to form a paint. The obtained paint was applied onto a cast-coated paper using a 150 μm (6-mil) applicator to produce a coated piece. The thus obtained coated piece was measured by the method prescribed in JIS Z 8729 using a Multi-spectro-colour-meter "MSC-IS-2D" (manufactured by SUGA SHIKENKI CO., LTD.).

Example 1

<Production of Hematite Seed Crystals>

360 kg of iron materials were charged together with water into a reactor such that the total volume of contents of the reactor summed to 5 m³. After the contents of the reactor were heated to 90° C., 30% dilute nitric acid was continuously fed to the reactor at a rate of 18 liters/minute for 15 minutes while maintaining the temperature of the contents of the reactor at 90° C., thereby precipitating ferric nitrate. Then, additional 30% dilute nitric acid was continuously fed to the suspension containing the precipitated ferric nitrate at a rate of 18 liters/minute for 150 minutes, thereby conducting a hydrolysis reaction thereof. A part of the resultant reaction suspension was sampled, and then dried at 120° C., thereby obtaining reddish brown particles were hematite seed crystal particles having an average particle diameter of 0.03 μm (seed crystals A).

<Growth reaction of hematite seed crystal particles>

A separate reactor was charged with 5,000 kg of chopped iron materials and then with 6 m³ of the slurry containing the hematite seed crystals (concentration of hematite seed crystals: 0.21 mol/liter). Then, after 8 m³ of a 1.8 mol/liter ferrous nitrate slurry was added to the reactor, water was further added thereto such that the total volume of contents of the reactor summed to 30 m³. Then, the resultant aqueous ferrous nitrate solution containing the iron materials and the hematite seed crystals (amount of the hematite seed crystals present in the slurry: 20% by weight based on the weight of hematite particles produced) was heated to 82° C. for 5 hours while passing air therethrough, and then allowed to stand at a temperature of 82 to 85° C. for 24 hours. It was confirmed that the $Fe^{2+}$ concentration of the obtained solution was 38 g/liter. Then, air was passed through the resultant aqueous ferrous nitrate solution containing the iron materials and the reaction product at a temperature of 85 to 88° C. for 40 hours, thereby obtaining reddish brown precipitates.

The thus obtained reddish brown precipitates were filtered out, washed with water, dried at 120° C. and then pulverized by ordinary methods, thereby obtaining reddish brown particles.

It was confirmed that the thus obtained reddish brown particles had an average particle diameter of 0.15 μm; a hematite content of 95%; an equilibrium water content of 1.1%; an oil absorption of 35 ml/100 g; a heat resistance of 190° C.; and a tinting strength of 100%. As to the hue of the particles, the L* value thereof was 32.2; the a* value thereof was 35.6; and the b* value thereof was 38.2.

<Heat-Treatment Step>

50 kg of the thus obtained reddish brown particles were heated in air at 700° C. for one hour.

It was confirmed that the thus heated particles had an average particle diameter of 0.16 μm; a hematite content of 98%; an equilibrium water content of 0.2% by weight; an oil absorption of 32 ml/100 g; a heat resistance of 450° C.; and a tinting strength of 112%. As to the hue of the heated particles, the L* value thereof was 31.0; the a* value thereof was 34.7; and the b* value thereof was 36.8.

Example 2

<Production of Hematite Seed Crystals>

400 kg of iron materials were charged together with water into a reactor such that the total volume of contents of the reactor summed to 5 m³. After the contents of the reactor were heated to 92° C., 30% dilute nitric acid was continuously fed to the reactor at a rate of 1818 liters/minute for 30 minutes while maintaining the temperature of the contents of the reactor at 92° C., thereby precipitating ferric nitrate.

Then, additional 30% dilute nitric acid was continuously fed to the obtained suspension containing the precipitated ferric nitrate at a rate of 5.618 liters/minute for 50 minutes, thereby conducting a hydrolysis reaction thereof. A part of the resultant suspension was sampled, and then dried at 120° C., thereby obtaining reddish brown particles. It was confirmed that the obtained reddish brown particles were hematite seed crystal particles having an average particle diameter of 0.05 μm (seed crystals B).

Examples 3 to 7

<Growth Reaction of Hematite Seed Crystals>

The same procedure as defined in Example 1 was conducted except that amount of iron materials used in the growth reaction of granular hematite seed crystals, kind, concentration and amount of slurry containing hematite seed crystals, amount of hematite seed crystals present in the slurry, concentration and amount of ferrous nitrate, total volume of contents of the reactor, and amount of air passed, temperature and time upon the growth reaction of the hematite seed crystals were changed variously, thereby producing granular hematite particles.

Main production conditions and various properties of the obtained granular hematite particles are shown in Tables 1 and 2. Meanwhile, the granular hematite particles obtained in Example 7 before pulverization had an L* value of 23.47, an a* value of 28.31 and a b* value of 18.10.

Examples 8 to 15

<Heat-Treatment Step>

The same procedure as defined in Example 1 was conducted except that kind of hematite particles produced and heat-treating temperature and time were changed variously, thereby producing granular hematite particles.

Main production conditions and various properties of the obtained granular hematite particles are shown in Table 3.

In addition, the granular hematite particles produced by heating the granular hematite particles obtained from the aqueous solution in Example 7 exhibited a deep red color even after pulverization, i.e., it was confirmed that the granular hematite particles obtained after the pulverization and heat-treatment had the substantially same hue as that of those obtained from the aqueous solution before the pulverization.

TABLE 1

| | Growth reaction of hematite seed crystals Iron materials | |
|---|---|---|
| Examples | Kind | Amount (kg) |
| Example 3 | Chopped iron | 5,000 |
| Example 4 | Chopped iron | 5,000 |
| Example 5 | Chopped iron | 5,000 |
| Example 6 | Chopped iron | 5,000 |
| Example 7 | Chopped iron | 6,000 |

| | Growth reaction of hematite seed crystals Hematite seed crystals | | | |
|---|---|---|---|---|
| | | Slurry | | Amount present |
| Examples | Kind of hematite seed crystals | Concentration (mol/l) | Amount (m³) | in reaction system (wt. %) |
| Example 3 | Seed crystals A | 0.2 | 8 | 28 |
| Example 4 | Seed crystals A | 0.2 | 7 | 23 |
| Example 5 | Seed crystals A | 0.2 | 6 | 20 |
| Example 6 | Seed crystals B | 0.2 | 6 | 17 |
| Example 7 | Seed crystals B | 0.2 | 5 | 12 |

| | Growth reaction of hematite seed crystals | | |
|---|---|---|---|
| | Aqueous ferrous nitrate solution | | Total |
| Examples | Concentration (mol/l) | Amount (m³) | volume (m³) |
| Example 3 | 1.8 | 7 | 30 |
| Example 4 | 1.8 | 8 | 30 |
| Example 5 | 1.8 | 8 | 30 |
| Example 6 | 1.8 | 8 | 30 |
| Example 7 | 1.8 | 8 | 30 |

TABLE 1-continued

| | Growth reaction of hematite seed crystals | | | |
|---|---|---|---|---|
| | Growth reaction-1 | | | Concentration |
| Examples | Amount of air passed (m³/min) | Temperature (° C.) | Time (hour) | of Fe²⁺ (g/l) |
| Example 3 | 1 | 82 | 20 | 28 |
| Example 4 | 1 | 83 | 22 | 35 |
| Example 5 | 1 | 85 | 24 | 38 |
| Example 6 | 1 | 85 | 24 | 16 |
| Example 7 | 1 | 85 | 24 | 35 |

| | Growth reaction of hematite seed crystals Growth reaction-2 | | | Additional amount of |
|---|---|---|---|---|
| Examples | Amount of air passed (m³/min) | Temperature (° C.) | Time (hour) | ferrous nitrate added (mol) |
| Example 3 | 2 | 86 | 35 | — |
| Example 4 | 2 | 88 | 40 | — |
| Example 5 | 2 | 88 | 42 | — |
| Example 6 | 1.5 | 85 | 45 | 900 |
| Example 7 | 2 | 90 | 50 | — |

TABLE 2

| | Granular hematite particles obtained from aqueous solution | | |
|---|---|---|---|
| Examples | Average particle diameter (μm) | Purity (%) | Equilibrium water content (%) |
| Example 3 | 0.10 | 94.0 | 1.1 |
| Example 4 | 0.13 | 95.0 | 1.0 |
| Example 5 | 0.15 | 95.5 | 0.9 |
| Example 6 | 0.20 | 95.0 | 1.0 |
| Example 7 | 0.52 | 94.0 | 0.7 |

| | Granular hematite particles obtained from aqueous solution | | |
|---|---|---|---|
| Examples | Oil absorption (ml/100 g) | Heat resistance (° C.) | Tinting strength (%) |
| Example 3 | 37 | 200 | 100 |
| Example 4 | 35 | 200 | 100 |
| Example 5 | 35 | 220 | 100 |
| Example 6 | 30 | 220 | 100 |
| Example 7 | 28 | 220 | 100 |

| | Granular hematite particles obtained from aqueous solution Hue | | |
|---|---|---|---|
| Examples | L* value | a* value | b* value |
| Example 3 | 33.50 | 35.64 | 40.97 |
| Example 4 | 33.94 | 36.99 | 39.86 |
| Example 5 | 31.97 | 35.35 | 38.10 |
| Example 6 | 30.25 | 34.47 | 35.49 |
| Example 7 | 23.47 | 28.31 | 18.10 |

TABLE 3

| | | Heating step | |
|---|---|---|---|
| Examples | Kind of hematite particles produced | Temperature (° C.) | Time (min) |
| Example 8 | Example 5 | 600 | 60 |
| Example 9 | Example 5 | 700 | 60 |
| Example 10 | Example 3 | 600 | 90 |
| Example 11 | Example 3 | 700 | 90 |
| Example 12 | Example 3 | 800 | 60 |
| Example 13 | Example 4 | 700 | 60 |

TABLE 3-continued

| Example 14 | Example 6 | 700 | 90 |
| Example 15 | Example 7 | 700 | 60 |

| | Granular hematite particles | | |
|---|---|---|---|
| Examples | Average particle diameter (μm) | Purity (%) | Equilibrium water content (%) |
| Example 8 | 0.16 | 98.1 | 0.25 |
| Example 9 | 0.16 | 98.2 | 0.21 |
| Example 10 | 0.13 | 97.8 | 0.25 |
| Example 11 | 0.13 | 98.0 | 0.22 |
| Example 12 | 0.14 | 98.1 | 0.23 |
| Example 13 | 0.15 | 98.1 | 0.22 |
| Example 14 | 0.20 | 98.3 | 0.21 |
| Example 15 | 0.50 | 98.2 | 0.22 |

| | Granular hematite particles | | |
|---|---|---|---|
| Examples | Oil absorption (ml/100 g) | Tinting strength (%) | Heat resistance (° C.) |
| Example 8 | 33 | 109 | 500 |
| Example 9 | 32 | 107 | 600 |
| Example 10 | 32 | 112 | 500 |
| Example 11 | 27 | 109 | 600 |
| Example 12 | 25 | 105 | 700 |
| Example 13 | 30 | 112 | 600 |
| Example 14 | 23 | 105 | 600 |
| Example 15 | 20 | 105 | 600 |

| | Granular hematite particles Hue | | |
|---|---|---|---|
| Examples | L* value | a* value | b* value |
| Example 8 | 30.71 | 34.80 | 36.74 |
| Example 9 | 31.07 | 35.01 | 36.71 |
| Example 10 | 32.19 | 35.75 | 39.18 |
| Example 11 | 32.19 | 35.60 | 38.15 |
| Example 12 | 31.49 | 36.54 | 37.37 |
| Example 13 | 31.76 | 35.35 | 37.07 |
| Example 14 | 29.08 | 34.84 | 33.82 |
| Example 15 | 22.96 | 25.51 | 14.49 |

What is claimed is:

1. A process for producing granular hematite particles, comprising:
    passing an oxygen-containing gas through an aqueous ferrous nitrate solution in the presence of iron materials and hematite seed crystals at a temperature of 80 to 90° C., thereby obtaining reddish brown precipitates containing granular hematite particles as a main component;
    subjecting the reddish brown precipitates to filtration, water-washing and then drying; and
    heat-treating the reddish brown precipitates in air at a temperature of 450 to 900° C.

2. A process according to claim 1, wherein the hematite seed crystals are hematite particles obtained by adding dilute nitric acid to an aqueous solution containing the iron materials while maintaining the aqueous solution at a temperature of 90 to 95° C. to precipitate ferric nitrate, and then hydrolyzing the ferric nitrate.

3. A process according to claim 1, wherein the reddish brown precipitates are heat-treated for 30 to 150 minutes.

4. Red-based color iron oxide pigments produced by the process as defined in claim 1, which have an average particle diameter of 0.05 to 0.6 μm, a hematite content of not less than 97% by weight, an equilibrium water content of not more than 0.5%, a heat resistance of not less than 450° C., a tinting strength of not less than 105%, and a hue having an L* value of 22 to 33, an a* value of 24 to 37 and a b* value of 13 to 40.

5. Red-based color iron oxide pigments produced by the process as defined in claim 1, which have an average particle diameter of 0.4 to 0.6 μm, a hematite content of not less than 98% by weight, an equilibrium water content of not more than 0.25%, a heat resistance of 500 to 800° C., a tinting strength of 105 to 120%, and a hue having an L* value of 22 to 24, an a* value of 24 to 29 and a b* value of 13 to 20.

6. A process for producing granular hematite particles which have an average particle diameter of 0.05 to 0.6 μm, a hematite content of not less than 97% by weight, an equilibrium water content of not more than 0.5%, a heat resistance of not less than 450° C., a tinting strength of not less than 105%, and a hue having an L* value of 22 to 33, an a* value of 24 to 37 and a b* value of 13 to 40, comprising:
    passing an oxygen-containing gas through an aqueous ferrous nitrate solution in the presence of iron materials and hematite seed crystals at a temperature of 80 to 90° C., thereby obtaining reddish brown precipitates containing granular hematite particles as a main component;
    subjecting the reddish brown precipitates to filtration, water-washing and then drying; and
    heat-treating the reddish brown precipitates in air at a temperature of 450 to 900° C.

7. A process for producing granular hematite particles which have an average particle diameter of 0.4 to 0.6 μm, a hematite content of not less than 98% by weight, an equilibrium water content of not more than 0.25%, a heat resistance of 500 to 800° C., a tinting strength of 105 to 120%, and a hue having an L* value of 22 to 24, an a* value of 24 to 29 and a b* value of 13 to 20, comprising:
    passing an oxygen-containing gas through an aqueous ferrous nitrate solution in the presence of iron materials and hematite seed crystals at a temperature of 80 to 90° C., thereby obtaining reddish brown precipitates containing granular hematite particles as a main component;
    subjecting the reddish brown precipitates to filtration, water-washing and then drying; and
    heat-treating the reddish brown precipitates in air at a temperature of 450 to 900° C.

8. A process for producing granular hematite particles, comprising:
    passing an oxygen-containing gas through an aqueous ferrous nitrate solution at a temperature of 80 to 90° C. in the presence of iron materials and hematite seed crystals obtained by adding dilute nitric acid to an aqueous solution containing the iron materials while maintaining the aqueous solution at a temperature of 90 to 95° C. to form ferric nitrate precipitates and then hydrolyzing the ferric nitrate precipitates at a temperature of 90 to 95° C. for 1 to 4 hours, in an amount of 5 to 40% by weight based on the weight of the granular hematite particles produced, thereby obtaining reddish brown precipitates containing granular hematite particles as a main component;
    subjecting the reddish brown precipitates to filtration, water-washing and then drying; and
    heat-treating the reddish brown precipitates in air at a temperature of 450 to 900° C. for 30 to 150 minutes.

* * * * *